US012407134B2

(12) United States Patent
Cao et al.

(10) Patent No.: US 12,407,134 B2
(45) Date of Patent: Sep. 2, 2025

(54) PULL STRAP CONNECTOR WITH IMPROVED PULL STRAP PRESSING MEMBER AND METHOD OF MAKING THE SAME

(71) Applicant: DONGGUAN LUXSHARE TECHNOLOGIES CO., LTD, Dongguan (CN)

(72) Inventors: Haihua Cao, Dongguan (CN); Qiongnan Chen, Dongguan (CN); Kaide Wang, Dongguan (CN); Zhiqiang Wang, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 356 days.

(21) Appl. No.: 18/076,115

(22) Filed: Dec. 6, 2022

(65) Prior Publication Data

US 2023/0361508 A1 Nov. 9, 2023

(30) Foreign Application Priority Data

May 6, 2022 (CN) ......................... 202210484682.2

(51) Int. Cl.
*H01R 13/633* (2006.01)
*H01R 13/405* (2006.01)
(Continued)

(52) U.S. Cl.
CPC ......... *H01R 13/633* (2013.01); *H01R 13/405* (2013.01); *H01R 13/506* (2013.01); (Continued)

(58) Field of Classification Search
None
See application file for complete search history.

(56) References Cited

U.S. PATENT DOCUMENTS 7,857,650 B1 * 12/2010 Wu .................... H01R 13/6335 439/352
10,886,649 B1 1/2021 Yang et al.
(Continued)

FOREIGN PATENT DOCUMENTS

CN 111129867 B 3/2021
CN 112467463 A 3/2021
(Continued)

*Primary Examiner* — Oscar C Jimenez
(74) *Attorney, Agent, or Firm* — Birch, Stewart, Kolasch & Birch, LLP

(57) ABSTRACT

A pull strap connector includes an insulating body, a tongue plate, a cable, a pull strap unlocking device and a pull strap. The insulating body includes a mating space and a rear wall. The tongue plate includes a tongue portion extending into the mating space. The pull strap unlocking device includes a locking piece, and the locking piece includes a locking protrusion. The pull strap connector further includes a pull strap pressing member provided separately from the insulating body and fixed to the rear wall. The pull strap passes through the pull strap pressing member. The pull strap is configured to unlock in a downward direction to move the locking protrusion downwardly. A method of making the pull strap connector is also disclosed.

20 Claims, 12 Drawing Sheets

(51) Int. Cl.

| | |
|---|---|
| ***H01R 13/506*** | (2006.01) |
| ***H01R 13/627*** | (2006.01) |
| ***H01R 43/02*** | (2006.01) |
| ***H01R 43/18*** | (2006.01) |
| ***H01R 43/20*** | (2006.01) |

(52) U.S. Cl.

CPC ......... *H01R 13/6275* (2013.01); *H01R 43/18* (2013.01); *H01R 43/20* (2013.01); *H01R 43/02* (2013.01)

(56) References Cited

U.S. PATENT DOCUMENTS

| | | | | |
|---|---|---|---|---|
| 2021/0075158 | A1* | 3/2021 | Hsu | H01R 13/6335 |
| 2021/0135402 | A1* | 5/2021 | Li | H01R 13/6335 |
| 2021/0336385 | A1* | 10/2021 | Shen | H01R 13/6272 |

FOREIGN PATENT DOCUMENTS

| | | | |
|---|---|---|---|
| CN | 212848936 | U | 3/2021 |
| CN | 213845580 | U | 7/2021 |
| CN | 216289282 | U | 4/2022 |
| CN | 217545108 | U | 10/2022 |
| TW | 1751774 | B | 1/2022 |

* cited by examiner

PULL STRAP CONNECTOR WITH IMPROVED PULL STRAP PRESSING MEMBER AND METHOD OF MAKING THE SAME

CROSS-REFERENCE TO RELATED APPLICATION

This patent application claims priority of a Chinese Patent Application No. 202210484682.2, filed on May 6, 2022 and titled "PULL STRAP CONNECTOR AND METHOD OF MAKING THE SAME", the entire content of which is incorporated herein by reference.

TECHNICAL FIELD

The present disclosure relates to a pull strap connector and a manufacturing method thereof, which belongs to a technical field of connectors.

BACKGROUND

A pull strap connector in the related art includes an insulating body, a cable, a pull strap unlocking device mounted on the insulating body, and a pull strap connected to the pull strap unlocking device. The pull strap unlocking device includes a locking piece. The locking piece includes a locking protrusion and a buckle portion protruding upward from the locking protrusion. The pull strap is connected with the buckle portion.

When unlocking, how to control the pull strap to generate a downward force so that the buckle portion can drive the locking protrusion to move downwardly is a technical problem to be solved by those skilled in the art.

SUMMARY

An object of the present disclosure is to provide a pull strap connector which is simple to manufacture and is configured to constrain a pulling direction of the pull strap, and a manufacturing method of the pull strap connector.

In order to achieve the above object, the present disclosure adopts the following technical solution: a pull strap connector, including: an insulating body including a mating space, a top wall located at a top of the mating space, and a rear wall located at a rear end of the mating space; a tongue plate including a tongue portion extending into the mating space, at least one surface of the tongue portion being provided with a mating portion exposed in the mating space; a cable connected with the tongue plate, the cable includes a cable extension portion extending through a bottom surface of the rear wall; a pull strap unlocking device including a locking piece mounted on the top wall, the locking piece including a locking protrusion and a buckle portion protruding upwardly from the locking protrusion; and a pull strap connected with the buckle portion; wherein the pull strap connector further includes a pull strap pressing member which is provided separately from the insulating body and fixed to the rear wall, the pull strap passes through the pull strap pressing member, the pull strap is configured to unlock the pull strap unlocking device in a downward direction to move the buckle portion downwardly, thereby driving the locking protrusion to move downwardly.

In order to achieve the above object, the present disclosure adopts the following technical solution: a method of manufacturing the foresaid pull strap connector, including following steps: S1, providing the tongue plate and the cable, and soldering the cable to the tongue plate; S2, providing the insulating body, and assembling the tongue plate to the insulating body; S3, providing the pull strap unlocking device, and installing the pull strap unlocking device on the insulating body; S4, providing the pull strap, and connecting the pull strap to the pull strap unlocking device; and S5, providing the pull strap pressing member, pressing the pull strap pressing member against the pull strap, and installing and fixing the pull strap pressing member to the rear wall of the insulating body.

Compared with the prior art, by providing the pull strap pressing member provided separately from the insulating body and fixed to the rear wall, the pull strap passing through the pull strap pressing member, the pull strap being configured to unlock the pull strap unlocking device in the downward direction to move the buckle portion downwardly, thereby driving the locking protrusion to move downwardly, the present disclosure simplifies the manufacture of the pull strap connector, and can constrain the pull direction of the pull strap, thereby making it easier to unlock the pull strap unlocking device.

DETAILED DESCRIPTION

Figure 1:
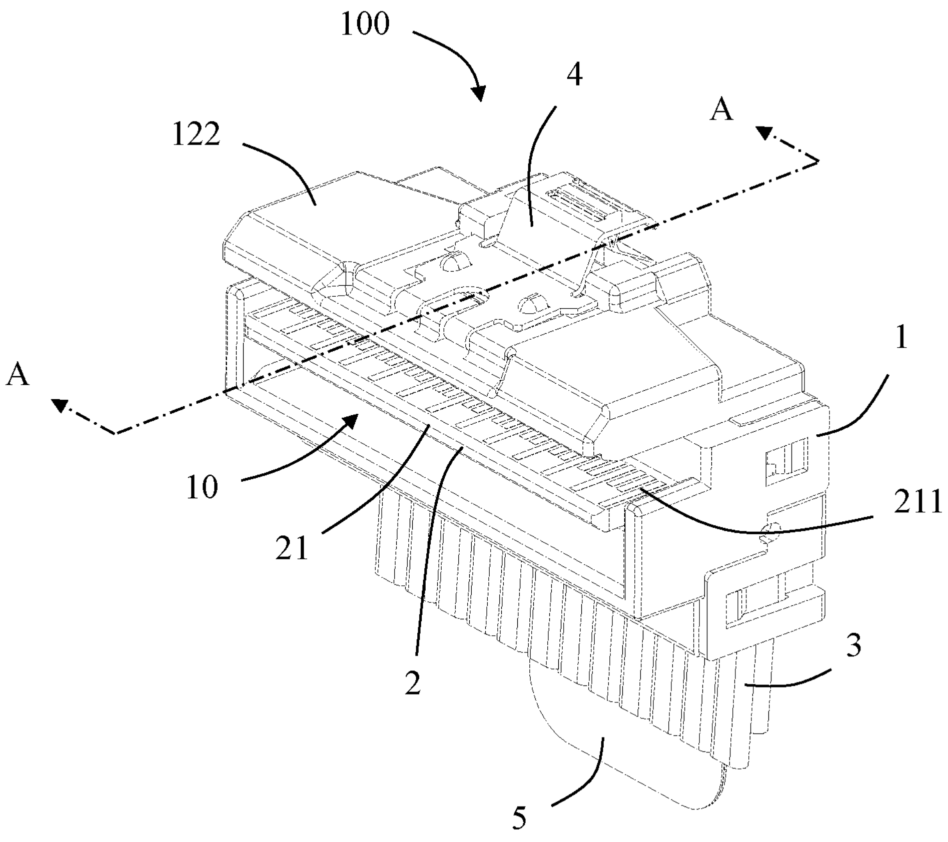
FIG. 1 is a perspective schematic view of a pull strap connector in accordance with an embodiment of the present disclosure.
Figure 2:
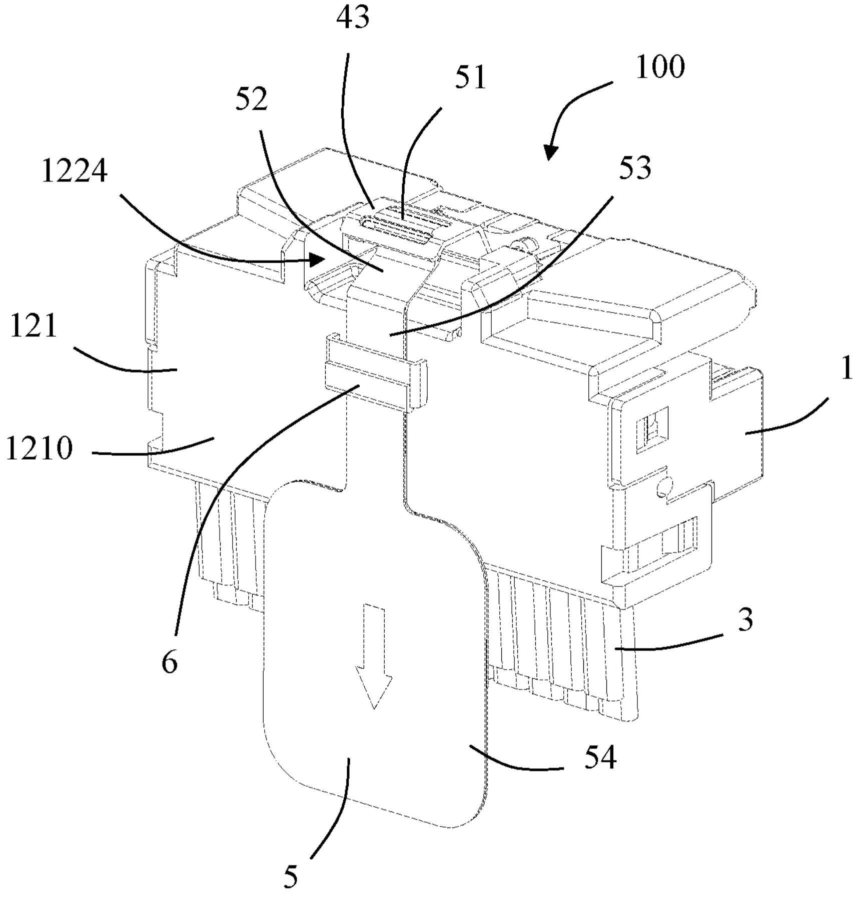
FIG. 2 is a perspective schematic view of FIG. 1 from another angle.
Figure 3:
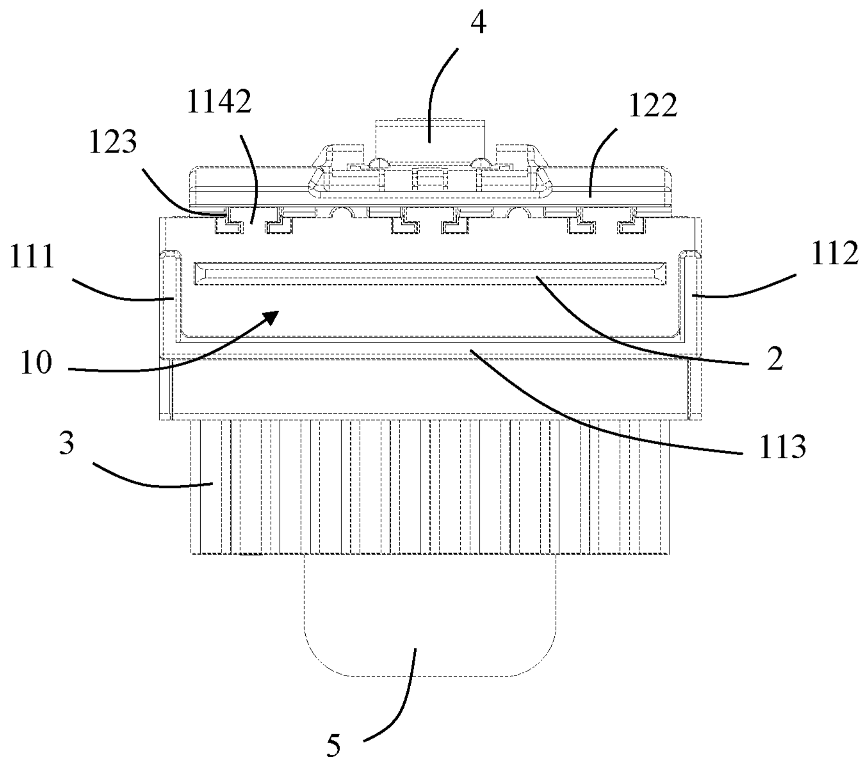
FIG. 3 is a front view of FIG. 1.
Figure 4:
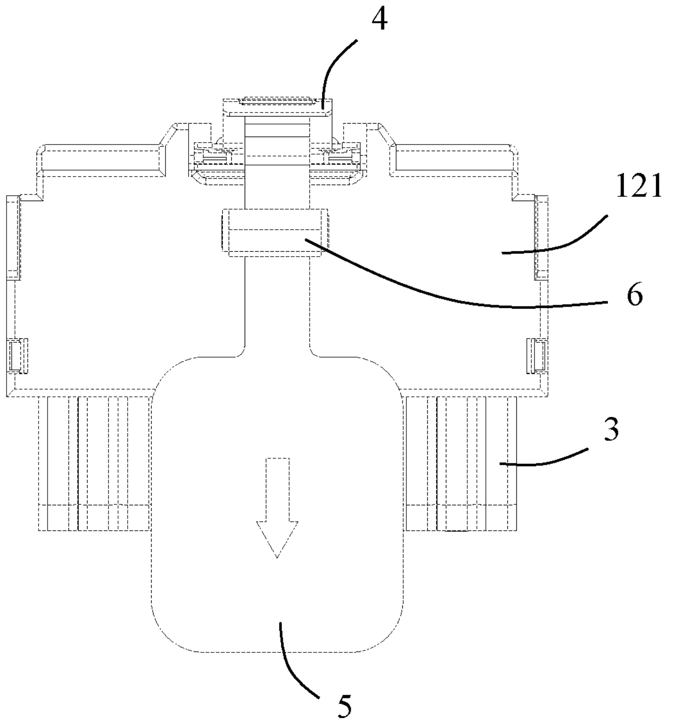
FIG. 4 is a rear view of FIG. 1.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 12, the present disclosure discloses a pull strap connector 100 including an insulating body 1, a tongue plate 2 installed to the insulating body 1, a cable 3 electrically connected with the tongue plate 2, a pull strap unlocking device 4 installed on the insulating body 1, a pull strap 5 connected with the pull strap unlocking device 4, and a pull strap pressing member 6 provided separately from the insulating body 1 and fixed to the insulating body 1. In the embodiment shown in the present disclosure, the pull strap connector 100 is an SFP (Small Form-Factor Pluggable) cable connector.

Figure 10:
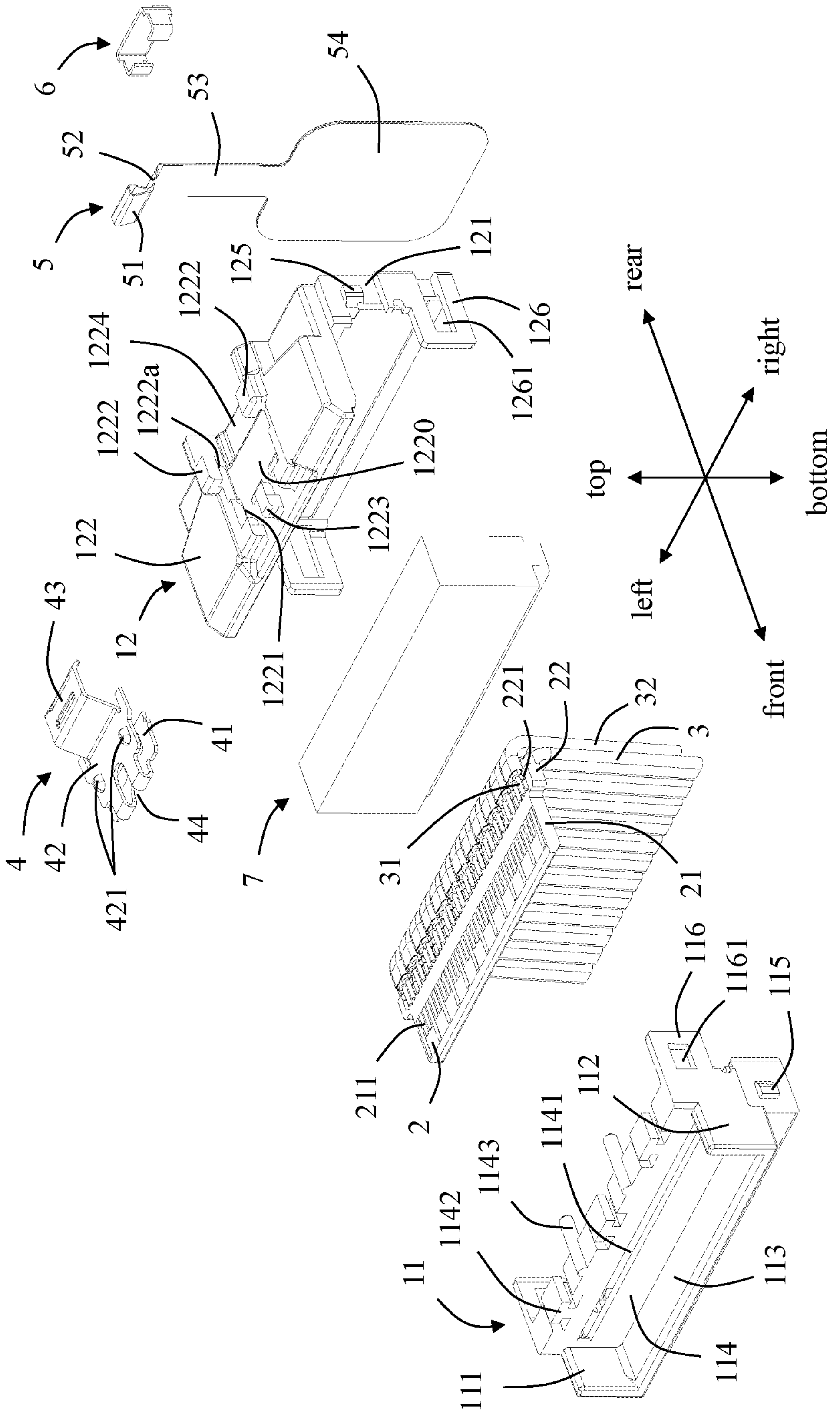
FIG. 10 is a further partial perspective exploded view of FIG. 8.

Referring to FIGS. 1 and 10, the insulating body 1 includes a mating space 10, a top wall 122 at a top of the mating space 10, and a rear wall 121 located at a rear end of the mating space 10. In the illustrated embodiment of the present disclosure, the insulating body 1 includes a first insulating body 11 and a second insulating body 12 which are assembled with each other. The first insulating body 11 includes a first side wall 111, a second side wall 112 opposite to the first side wall 111, and a bottom wall 113 connecting the first side wall 111 and the second side wall 112. The first side wall 111, the second side wall 112 and the bottom wall 113 are U-shaped as a whole. The mating space 10 is defined by the first side wall 111, the second side wall 112 and the bottom wall 113.

Figure 11:
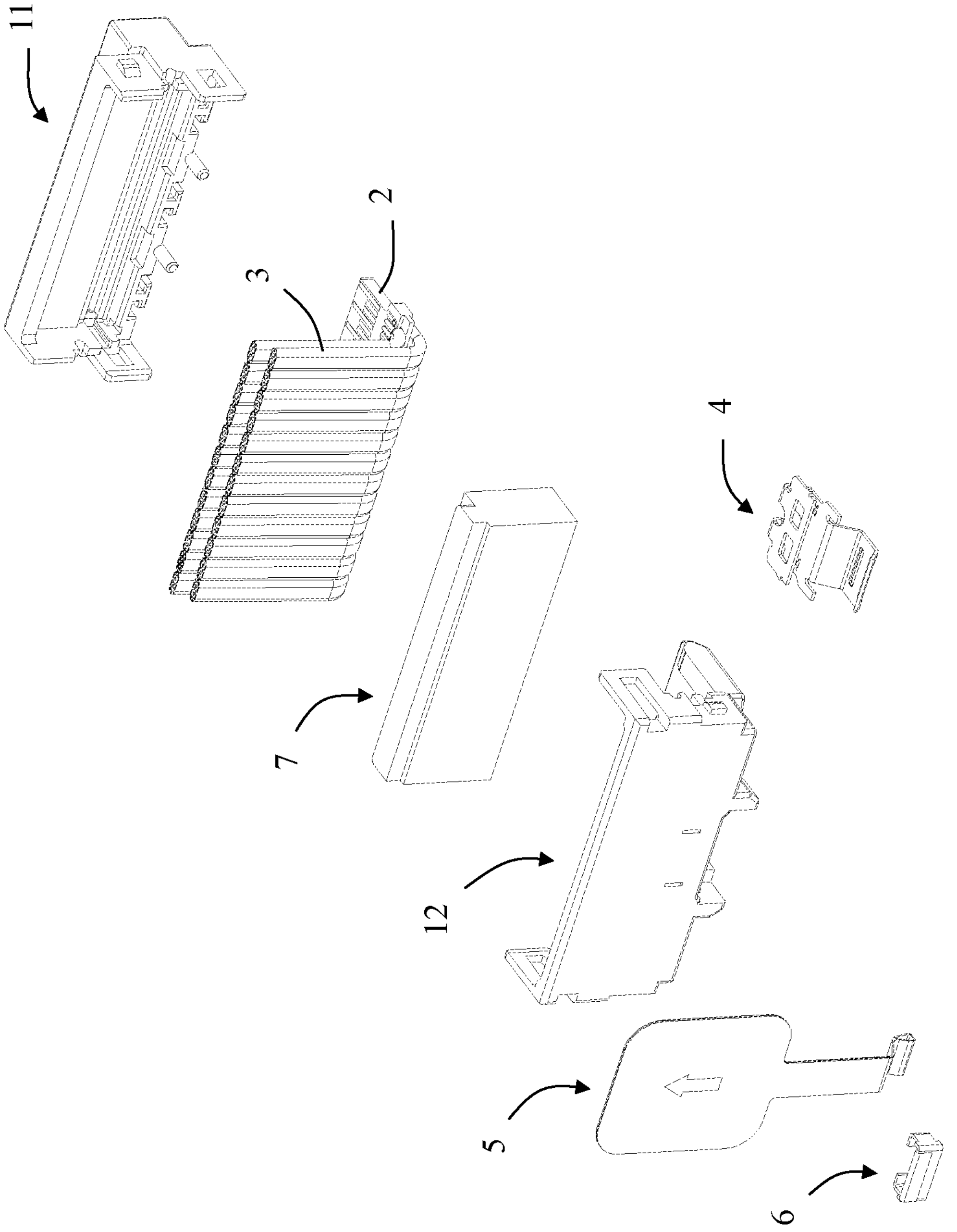
FIG. 11 is a partially exploded perspective view of FIG. 10 from another angle.
Figure 12:
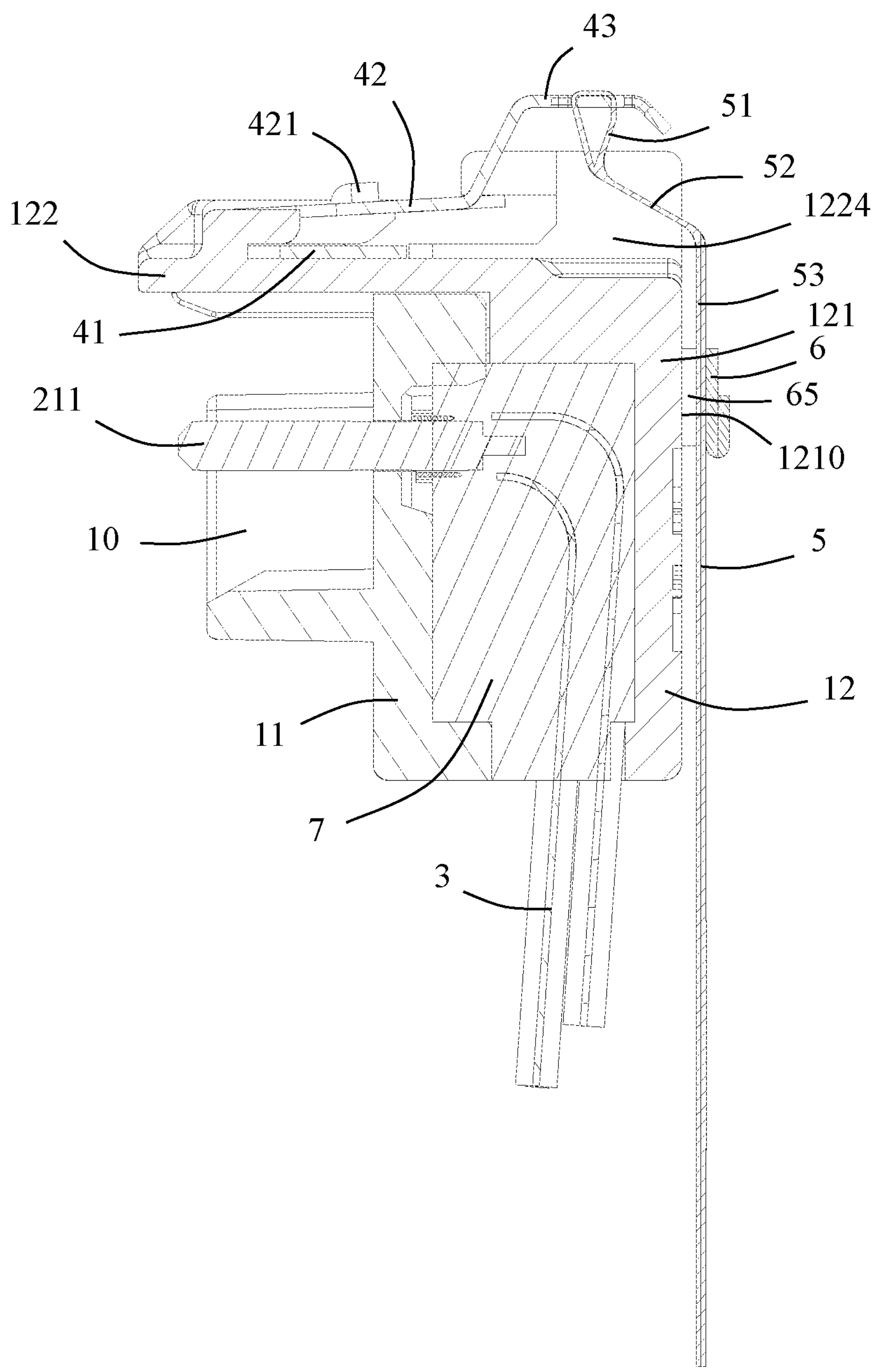
FIG. 12 is a schematic cross-sectional view taken along line A-A in FIG. 1.

Referring to FIGS. 10 and 11, the first insulating body 11 further includes a main body portion 114 located at a rear end thereof. The first side wall 111, the second side wall 112 and the bottom wall 113 are all formed by extending forwardly from the main body portion 114. The main body portion 114 is provided with a slot 1141 extending through the main body portion 114 along a front-rear direction. The slot 1141 communicates with the mating space 10 to install the tongue plate 2. The top surface of the main body portion 114 is provided with a plurality of T-shaped positioning blocks 1142 arranged at intervals along a left-right direction, and a plurality of positioning posts 1143 of which each is located between two adjacent positioning blocks 1142 and protrudes backwardly. Each side of the first insulating body 11 is provided with a first locking block 115 protruding outwardly and a first extending block 116 extending backwardly. The first extending block 116 includes a first locking slot 1161.

The second insulating body 12 includes the rear wall 121 and the top wall 122 which extends forwardly from a top of the rear wall 121. Each side of the second insulating body 12 is provided with a second locking block 125 protruding outwardly and a second extending block 126 extending forwardly. The second extending block 126 includes a second locking slot 1261. After the first insulating body 11 and the second insulating body 12 are assembled, the first locking block 115 is held in the second locking slot 1261, and the second locking block 125 is held in the first locking slot 1161, thereby preventing the first insulating body 11 and the second insulating body 12 from being separated from each other in the front-rear direction. The second insulating body 12 includes a plurality of T-shaped positioning grooves 123. The positioning blocks 1142 are assembled and fixed in the positioning grooves 123 in the front-rear direction to prevent the first insulating body 11 and the second insulating body 12 from being separated from each other in a vertical direction. The second insulating body 12 further includes a plurality of positioning holes (not shown) for receiving the positioning posts 1143.

Figure 8:
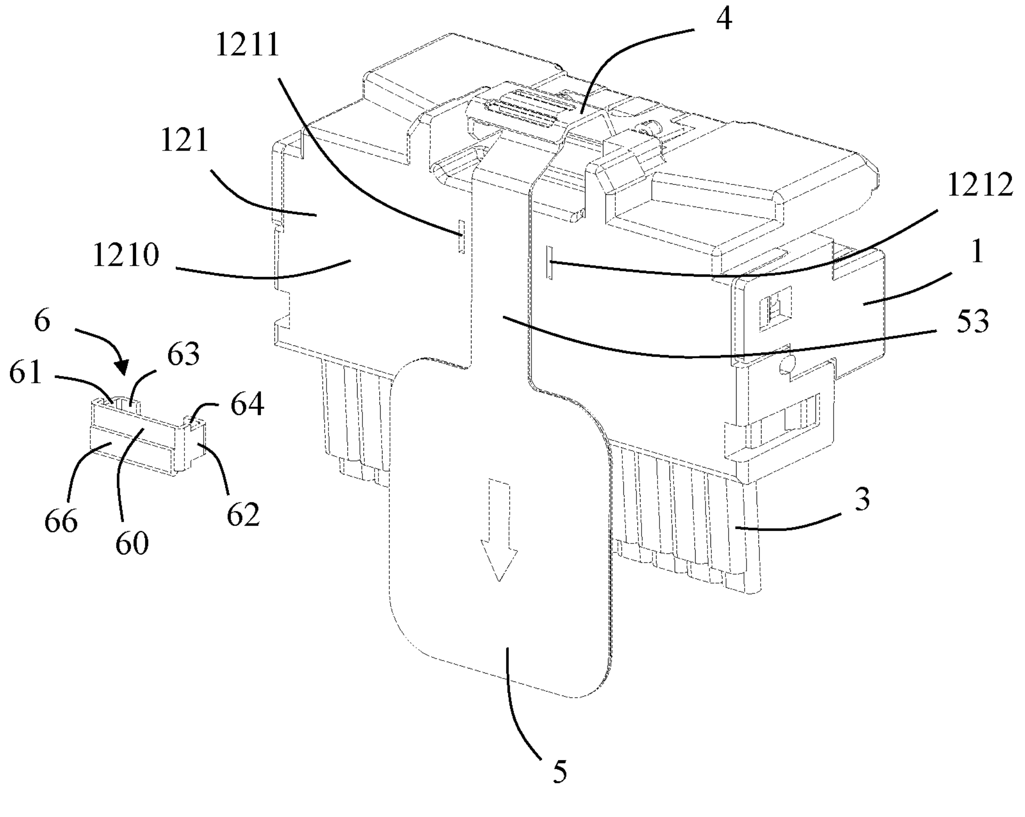
FIG. 8 is a partial perspective exploded view of FIG. 1, wherein a pull strap pressing member is separated.
Figure 9:
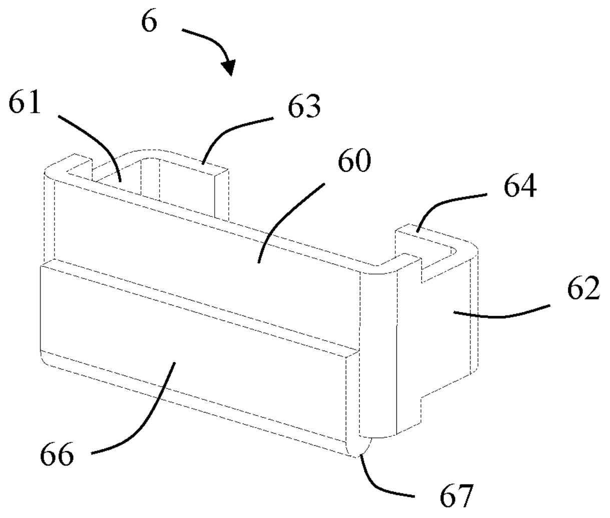
FIG. 9 is a perspective schematic view of the pull strap pressing member shown in FIG. 8.

Referring to FIG. 8, the rear wall 121 includes a rear wall surface 1210, a first fixing groove 1211 and a second fixing groove 1212. The first fixing groove 1211 and the second fixing groove 1212 at least extend backwardly through the rear wall surface 1210.

Referring to FIG. 10, the top wall 122 extends forwardly and protrudes from the rear wall 121 to cover the top of the mating space 10. A gap is formed between the first side wall 111 and the top wall 122 along the vertical direction, and another gap is formed between the second side wall 112 and the top wall 122 along the vertical direction. That is, the first side wall 111 and the second side wall 112 are not in contact with the top wall 122 along the vertical direction. The top wall 122 includes an installation space 1220, two first installation grooves 1221 located on both sides of the installation space 1220 and communicating with the installation space 1220, two raised portions 1222 located at a rear end of the installation space 1220 and raised upwardly, and a limiting block 1223 located at a front of the installation space 1220. Each of the raised portions 1222 includes a second installation groove 1222*a*. The second installation groove 1222*a* is located at the rear end of the first installation groove 1221 and is higher than the first installation groove 1221. The top wall 122 includes a recessed space 1224 located between the two raised portions 1222 and recessed downwardly.

Figure 5:
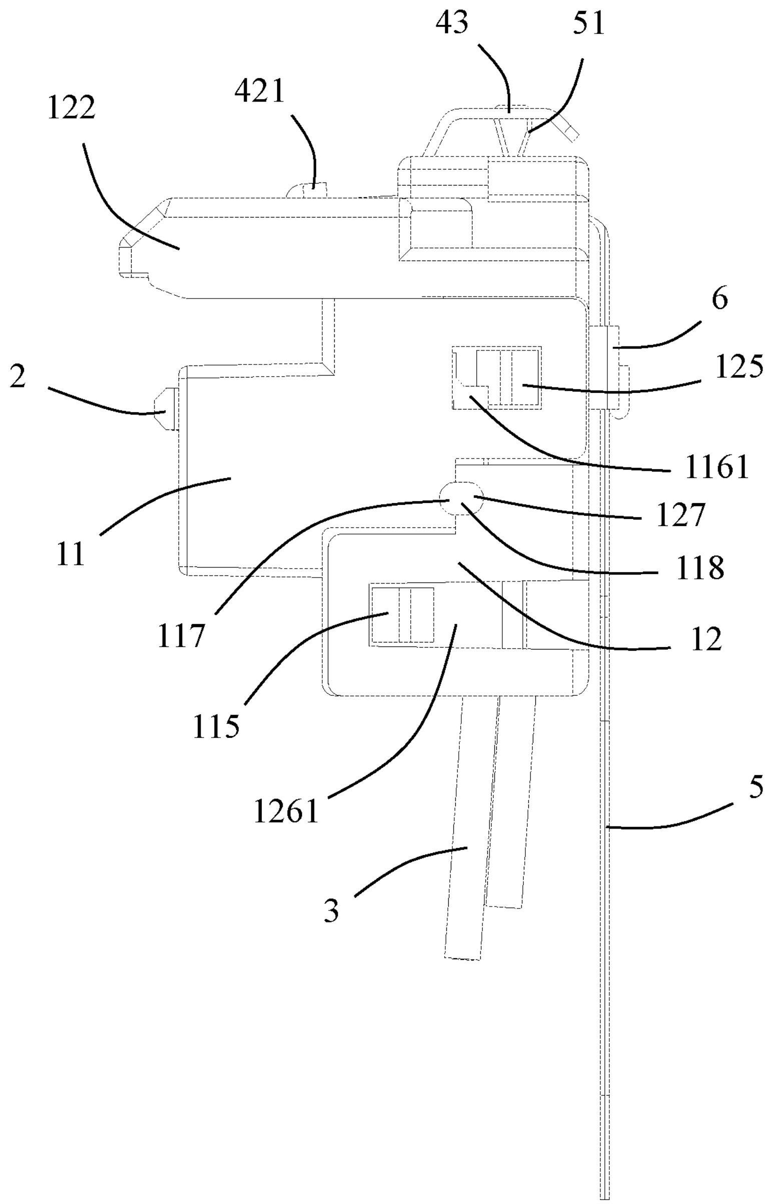
FIG. 5 is a right side view of FIG. 1.
Figure 6:
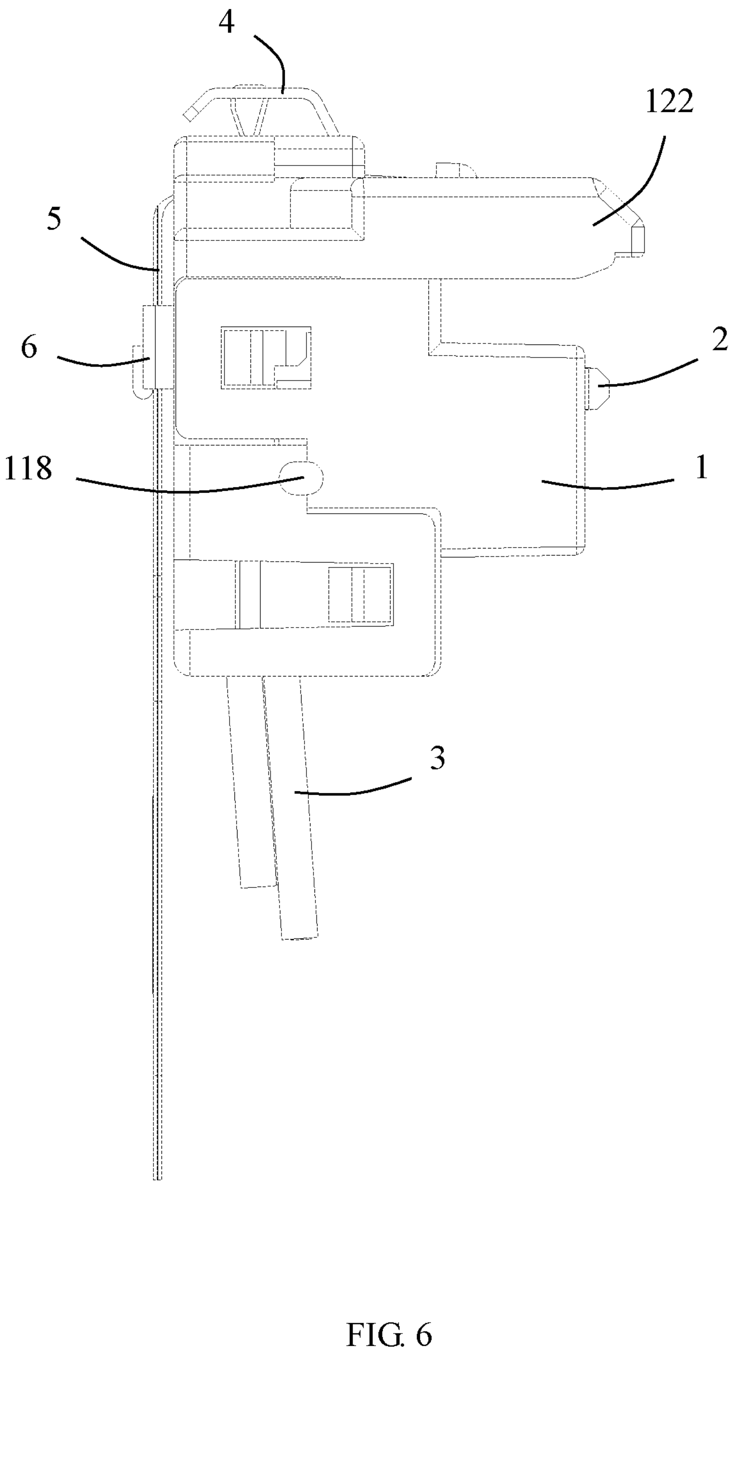
FIG. 6 is a left side view of FIG. 1.
Figure 7:
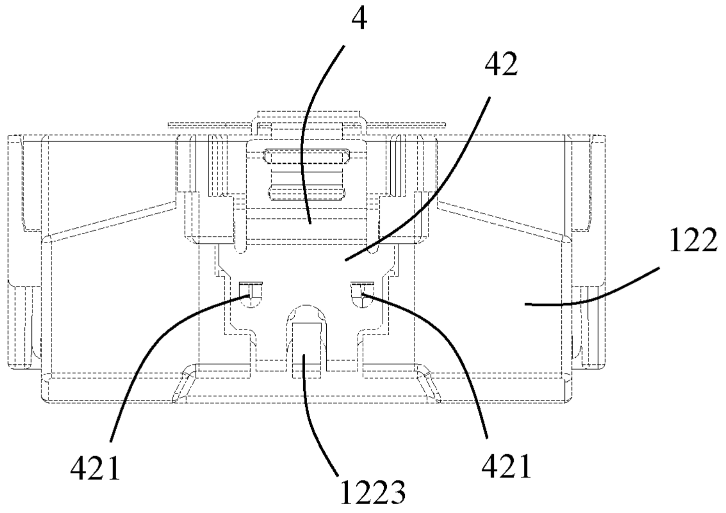
FIG. 7 is a top view of FIG. 1.

In addition, the first insulating body 11 further includes a first half injection hole 117. The second insulating body 12 includes a second half injection hole 127. The first half injection hole 117 and the second half injection hole 127 form an injection hole 118 at a seam between the first insulating body 11 and the second insulating body 12. Referring to FIG. 5, in the embodiment shown in the present disclosure, the first half injection hole 117 and the second half injection hole 127 are both semicircular holes. The injection hole 118 is a round hole. Of course, it is understandable to those skilled in the art that the first half injection hole 117 and the second half injection hole 127 may also have other shapes, which are not limited in the present disclosure. By providing the injection hole 118 at the seam between the first insulating body 11 and the second insulating body 12, an insulating material can fill the first half-injection hole 117 and the second half-injection hole 127, so as to facilitate the close combination of the first insulating body 11 and the second insulating body 12.

The tongue plate 2 includes a tongue portion 21 which passes through the slot 1141 and extends forwardly into the mating space 10, and a mounting portion 22 located at a rear end of the tongue portion 21. In the embodiment shown in the present disclosure, the tongue plate 2 is a built-in circuit board. Upper and lower surfaces of the tongue portion 21 are provided with mating portions 211. The mating portions 211 include a plurality of conductive pads arranged at intervals. The mating portions 211 are exposed to the mating space 10 so as to be in contact with conductive terminals (not shown) of a mating connector. The upper and lower surfaces of the mounting portion 22 are respectively provided with a plurality of soldering pads 221 for being soldered with the cable 3. In the embodiment shown in the present disclosure, a width of the mounting portion 22 along the left-right direction is greater than a width of the tongue portion 21 along the left-right direction. With this arrangement, when the tongue plate 2 is inserted into the slot 1141, the mounting portion 22 can be blocked by the main body portion 114, so as to function as a limiter. In addition, the wider mounting portion 22 facilitates the arrangement of the soldering pads 221. For example, it is beneficial to appropriately increase a distance between two adjacent soldering pads 221, thereby reducing signal crosstalk and facilitating soldering with the cable 3. In the illustrated embodiment of the present disclosure, the cable 3 is substantially L-shaped, which includes a horizontal portion 31 soldered with the soldering pads 221 and a cable extension portion 32 bent downwardly from the horizontal portion 31. After the insulating material is solidified, an insulating block 7 covering soldering positions of the cable 3 and the soldering pads 221 is formed. As a result, the risk of the cable 3 being detached from the tongue plate 2 is reduced, thereby improving the reliability of the pull strap connector 100.

In an embodiment of the present disclosure, the pull strap unlocking device 4 is made of metal material, and is generally U-shaped. The pull strap unlocking device 4 includes a fixing portion 41, a locking piece 42 bent upwardly and backwardly from a front end of the fixing portion 41, and a buckle portion 43 extending upwardly and backwardly from a rear end of the locking piece 42. The fixing portion 41 and the locking piece 42 are provided with an opening 44 extending forwardly therethrough. The locking piece 42 includes two locking protrusions 421 protruding upwardly. The buckle portion 43 protrudes upwardly beyond the locking protrusions 421. During assembly, the pull strap unlocking device 4 is installed in the installation space 1220 of the top wall 122 along a rear-to-front direction. Opposite sides of the fixing portion 41 are clamped in the first installation grooves 1221. Opposite sides of the locking piece 42 are accommodated in the second installation grooves 1222*a*. The limiting block 1223 is received in the opening 44. In the embodiment shown in the present disclosure, the buckle portion 43 is raised. The buckle portion 43 protrudes upwardly beyond the raised portions 1222. The locking piece 42 abuts against bottom surfaces of the raised portions 1222. That is, the raised portions 1222 can limit the highest position where the locking piece 42 moves upwardly. Since the pull strap unlocking device 4 is generally U-shaped, the locking piece 42 can be deformed downwardly. The locking protrusions 421 are used for locking with locking holes (not shown) of the mating connector. In the embodiment shown in the present disclosure, the two locking protrusions 421 are arranged side by side. Preferably, the locking protrusions 421 are stamped from the locking piece 42. The buckle portion 43 is suspended above the recessed space 1224.

The pull strap 5 includes a connecting portion 51 fastened to the buckle portion 43, an inclined portion 52 inclined backwardly and downwardly from the connecting portion 51, a straight portion 53 extending downwardly from the inclined portion 52, and a force applying portion 54 connected to the straight portion 53. In the embodiment shown in the present disclosure, widths of the straight portion 53, the inclined portion 52 and the connecting portion 51 along the left-right direction are equal. A width of the force applying portion 54 along the left-right direction is larger than the width of the straight portion 53 along the left-right direction, so that the force applying portion 54 has a relatively large area, which is convenient for the user to operate.

In the illustrated embodiment of the present disclosure, the pull strap pressing member 6 is made of a metal sheet. The pull strap pressing member 6 includes a limiting wall 60 parallel to the rear wall surface 1210, a first bent wall 61 bent forwardly from one side of the limiting wall 60, a second bent wall 62 bent forwardly from the other side of the limiting wall 60, a first hook portion 63 bent from a front end of the first bent wall 61 toward the second bent wall 62, and a second hook portion 64 bent from a front end of the second bent wall 62 toward the first bent wall 61. The first bent wall 61 and the second bent wall 62 are parallel to each other. The first bent wall 61 and the second bent wall 62 are both perpendicular to the limiting wall 60. The pull strap connector 100 includes a slot 65 located between the rear wall surface 1210 and the limiting wall 60. The pull strap 5 extends downwardly through the slot 65. The first hook portion 63 and the second hook portion 64 are fixed in the first fixing groove 1211 and the second fixing groove 1212, respectively. A depth of the slot 65 in the front-rear direction can be controlled by controlling the dimensions of the first bent wall 61 and the second bent wall 62 in the front-rear direction. In the illustrated embodiment of the present disclosure, the pull strap pressing member 6 includes a folded portion 66 folded upwardly from a bottom of the limiting wall 60, and an arc surface 67 located at a connection between the limiting wall 60 and the folded portion 66. By providing the folded portion 66, the structural strength of the pull strap pressing member 6 can be increased, and the risk of damage to the pull strap pressing member 6 caused by the external force applied to the pull strap 5 can be reduced. In addition, the arc surface 67 is configured to be in contact with the pull strap 5, which reduces the risk of wear of the pull strap 5 and facilitates the smoothness of unlocking.

In an embodiment of the present disclosure, the pull strap pressing member 6 is fixed to the rear wall 121 by riveting so as to improve the holding force of the pull strap pressing member 6. Of course, in other embodiments, the first fixing groove 1211 and the second fixing groove 1212 can also extend upwardly through the rear wall 121, so that the pull strap pressing member 6 can be assembled to the rear wall 121 along the top-to-bottom direction.

The pull strap 5 is configured to be unlocked in a downward direction to move the buckle portion 43 downwardly, thereby driving the lock protrusion 421 to move downwardly so as to achieve unlocking. In the embodiment shown in the present disclosure, an unlocking direction (e.g., the downward direction) of the pull strap 5 is the same as an unlocking direction (e.g., the downward direction) of the locking piece 42. This arrangement, on the one hand, it is beneficial to shorten the unlocking stroke of the pull strap 5; on the other hand, it is also beneficial to improve the smoothness when unlocking, so that it is easy to operate.

The present disclosure also discloses a method for manufacturing the aforementioned pull strap connector 100, and the manufacturing method includes the following steps:

S1, providing the tongue plate 2 and the cable 3, and soldering the cable 3 to the tongue plate 2;

S2, providing the insulating body 1, and installing the tongue plate 2 to the insulating body 1;

S3, providing the pull strap unlocking device 4, and installing the pull strap unlocking device 4 on the insulating body 1;

S4, providing the pull strap 5, and connecting the pull strap 5 to the pull strap unlocking device 4; and S5, providing the pull strap pressing member 6, pressing the pull strap pressing member 6 against the pull strap 5, and installing and fixing the pull strap pressing member 6 to the rear wall 121.

Specifically, in the step S1, the cable 3 is soldered to the soldering pads 221 of the tongue plate 2.

In the step S2, the insulating body 1 includes a first insulating body 11 and a second insulating body 12. The tongue plate 2 passes through the slot 1141 of the first insulating body 11 to extend forwardly into the mating space 10. During the process of assembling the first insulating body 11 and the second insulating body 12 with each other, the positioning posts 1143 of the first insulating body 11 are inserted into the positioning holes of the second insulating body 12, the first locking blocks 115 are held in the second locking slots 1261, the second locking blocks 125 are held in the first locking slots 1161. At this time, an interior of the insulating body 1 includes a space between the main body portion 114 of the first insulating body 11 and the rear wall 121 of the second insulating body 12. The soldering positions of the cable 3 and the soldering pads 221 are located in the space.

In the step S4, in the process of connecting the pull strap 5 to the pull strap unlocking device 4, since the angle of the pull strap 5 at this time can be free from any external constraints, so that it is convenient to connect the pull strap 5 to the pull strap unlocking device 4. After being connected, the pull strap 5 is extended downwardly along the rear wall 121.

In the step S5, the pull strap pressing member 6 is fastened to the rear wall 121, and the pull strap pressing member 6 can limit the pull strap 5 from excessively moving outwardly.

The method further comprises the following step:

S6, providing an insulating material, and injecting the insulating material into the space between the main body portion 114 of the first insulating body 11 and the rear wall 121 of the second insulating body 12 from the injection hole 118. After the insulating material is solidified, an insulating block 7 covering the soldering positions of the cable 3 and the soldering pads 221 is formed. Thus, the risk of the cable 3 being detached from the tongue plate 2 is reduced, so as to improve the reliability of the pull strap connector 100.

It should be noted that, in the above steps of the present disclosure, it is only necessary to ensure that the step of installing the pull strap pressing member 6 (e.g., the step S5) occurs after the step of installing the pull strap 5 (for example, the step S4), and other steps of the present disclosure can be flexibly adjusted as needed.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A pull strap connector, comprising:

an insulating body comprising a mating space, a top wall located at a top of the mating space, and a rear wall located at a rear end of the mating space;

a tongue plate comprising a tongue portion extending into the mating space, at least one surface of the tongue portion being provided with a mating portion exposed in the mating space;

a cable connected with the tongue plate, the cable comprises a cable extension portion extending through a bottom surface of the rear wall;

a pull strap unlocking device comprising a locking piece mounted on the top wall, the locking piece comprising a locking protrusion and a buckle portion protruding upwardly from the locking protrusion; and a pull strap connected with the buckle portion;

wherein the pull strap connector further comprises a pull strap pressing member; the pull strap pressing member and the insulating body are two-piece components; the pull strap pressing member is assembled to the rear wall; the pull strap pressing member comprises a limiting wall, a first bent wall bent from one side of the limiting wall, and a second bent wall bent from another side of the limiting wall; the pull strap passes through the pull strap pressing member and is restricted between the first bent wall and the second bent wall; the pull strap is configured to unlock the pull strap unlocking device in a downward direction to move the buckle portion downwardly, thereby driving the locking protrusion to move downwardly.

2. The pull strap connector according to claim 1, wherein the pull strap pressing member is fixed to the rear wall by riveting.

3. The pull strap connector according to claim 1, wherein the rear wall comprises a rear wall surface, the limiting wall is parallel to the rear wall surface, the pull strap connector comprises a slot located between the rear wall surface and the limiting wall, and the pull strap extends downwardly through the slot.

4. The pull strap connector according to claim 3, wherein the rear wall comprises a first fixing groove and a second fixing groove, the first fixing groove and the second fixing groove extend backwardly through the rear wall surface, the pull strap pressing member comprises a first hook portion bent from a front end of the first bent wall toward the second bent wall, and a second hook portion bent from a front end of the second bent wall toward the first bent wall.

5. The pull strap connector according to claim 4, wherein the first bent wall and the second bent wall are parallel to each other, and both the first bent wall and the second bent wall are perpendicular to the limiting wall.

6. The pull strap connector according to claim 3, wherein the pull strap pressing member comprises a folded portion folded upwardly from a bottom of the limiting wall, and an arc surface located at a connection between the limiting wall and the folded portion.

7. The pull strap connector according to claim 1, wherein the pull strap pressing member is made of a metal sheet.

8. The pull strap connector according to claim 1, wherein the insulating body comprises a first insulating body and a second insulating body assembled with each other; wherein the first insulating body comprises a first side wall, a second side wall opposite to the first side wall, and a bottom wall connecting the first side wall and the second side wall; the mating space is defined by at least the first side wall, the second side wall and the bottom wall; and the second insulating body comprises the rear wall and the top wall extending forwardly from a top of the rear wall.

9. The pull strap connector according to claim 8, wherein each side of the first insulating body is provided with a first locking block protruding outwardly and a first extending block extending backwardly, the first extending block comprises a first locking slot;

wherein each side of the second insulating body is provided with a second locking block protruding outwardly and a second extending block extending forwardly, the second extending block comprises a second locking slot; and wherein the first locking block is locked in the second locking slot, and the second locking block is locked in the first locking slot.

10. The pull strap connector according to claim 8, wherein the first insulating body comprises a T-shaped positioning block, the second insulating body comprises a T-shaped positioning groove, and the positioning block is assembled and fixed in the positioning groove along a front-to-rear direction.

11. The pull strap connector according to claim 1, wherein the first insulating body comprises a first half injection hole, the second insulating body comprises a second half injection hole, and the first half injection hole and the second half injection hole form an injection hole at a seam between the first insulating body and the second insulating body.

12. The pull strap connector according to claim 11, wherein the tongue plate is a built-in circuit board, the tongue plate comprises a mounting portion which is provided with a plurality of soldering pads, the cable is soldered to the soldering pads; the pull strap connector further comprises an insulating material injected into the pull strap connector from the injection hole; after the insulating material is solidified, an insulating block covering soldering positions of the cable and the soldering pads is formed.

13. A method of manufacturing a pull strap connector according to claim 1, the manufacturing method comprises following steps:

S1, providing the tongue plate and the cable, and soldering the cable to the tongue plate;

S2, providing the insulating body, and assembling the tongue plate to the insulating body;

S3, providing the pull strap unlocking device, and installing the pull strap unlocking device on the insulating body;

S4, providing the pull strap, and connecting the pull strap to the pull strap unlocking device; and S5, providing the pull strap pressing member, pressing the pull strap pressing member against the pull strap, and installing and fixing the pull strap pressing member to the rear wall of the insulating body.

14. The method according to claim 13, wherein in the step S5, the pull strap pressing member is made of a metal sheet, and the pull strap pressing member is fixed to the rear wall by riveting.

15. The method according to claim 13, wherein the rear wall comprises a rear wall surface, the pull strap pressing member comprises a limiting wall parallel to the rear wall surface, the pull strap connector comprises a slot located between the rear wall surface and the limiting wall, and the pull strap extends downwardly through the slot.

16. The method according to claim 15, wherein the rear wall comprises a first fixing groove and a second fixing groove, the first fixing groove and the second fixing groove extend backwardly through the rear wall surface, the pull strap pressing member comprises a first bent wall bent forwardly from one side of the limiting wall, a second bent wall bent forwardly from another side of the limiting wall, a first hook portion bent from a front end of the first bent wall toward the second bent wall, and a second hook portion bent from a front end of the second bent wall toward the first bent wall.

17. The method according to claim 15, wherein the pull strap pressing member comprises a folded portion folded upwardly from a bottom of the limiting wall, and an arc surface located at a connection between the limiting wall and the folded portion.

18. The method according to claim 13, wherein the insulating body comprises a first insulating body and a second insulating body assembled with each other; wherein the first insulating body comprises a first side wall, a second side wall opposite to the first side wall, and a bottom wall connecting the first side wall and the second side wall; the mating space is defined by at least the first side wall, the second side wall and the bottom wall; and the second insulating body comprises the rear wall and the top wall extending forwardly from a top of the rear wall.

19. The method according to claim 13, wherein the first insulating body comprises a first half injection hole, the second insulating body comprises a second half injection hole, and the first half injection hole and the second half injection hole form an injection hole at a seam between the first insulating body and the second insulating body.

20. The method according to claim 19, wherein the tongue plate is a built-in circuit board, the tongue plate comprises a mounting portion which is provided with a plurality of soldering pads, the cable is soldered to the soldering pads; the method further comprises a following step:

S6, providing an insulating material, and injecting the insulating material into a space between the first insulating body and the second insulating body from the injection hole; after the insulating material is solidified, an insulating block covering soldering positions of the cable and the soldering pads is formed.

* * * * *